United States Patent [19]
Endo et al.

[11] Patent Number: 5,187,607
[45] Date of Patent: Feb. 16, 1993

[54] ELECTROCHROMIC DEVICE WITH LOW RESISTANCE ELECTRICAL CONNECTIONS

[75] Inventors: Tatsuo Endo, Yokohama; Mitsuyoshi Mizuno, Matsudo, both of Japan

[73] Assignee: Nikon Corporation, Tokyo, Japan

[21] Appl. No.: 491,053

[22] Filed: Mar. 9, 1990

[30] Foreign Application Priority Data

Mar. 13, 1989 [JP] Japan ............................... 1-60347
Jul. 3, 1989 [JP] Japan ............................. 1-78407[U]
Jul. 4, 1989 [JP] Japan ............................. 1-78968[U]

[51] Int. Cl.⁵ ...................... G02F 1/155; G02F 1/153
[52] U.S. Cl. ...................................... 359/266; 359/275
[58] Field of Search ............... 350/357, 336; 359/266, 359/275

[56] References Cited

U.S. PATENT DOCUMENTS 4,874,229 10/1989 Ito et al. ............................ 350/357
4,878,743 11/1989 Aikawa et al. ................... 350/357

FOREIGN PATENT DOCUMENTS 52-46098 11/1977 Japan .
63-38923 2/1988 Japan ................................ 350/357
63-81329 4/1988 Japan ................................ 350/357
1186541 4/1970 United Kingdom .

Primary Examiner—Rolf Hille
Assistant Examiner—Robert P. Limanek
Attorney, Agent, or Firm—Shapiro and Shapiro

[57] ABSTRACT

An electrochromic device is constructed with a first electrode layer, an electrochromic layer and a second electrode layer formed on a substrate in sequence, with at least one of the first and second electrode layers being a transparent electrode layer. The device is characterized in that a conductive thin film having a resistance lower than that of the transparent electrode layer is formed on part of the substrate, and part of the transparent electrode layer is formed on this conductive thin film. Alternatively, the conductive thin film is formed in contact with a part of the transparent electrode layer formed on an end surface of the substrate, and the area of the conductive thin film is larger than a corresponding underlying cross-sectional area of the substrate taken in the direction of the substrate thickness.

8 Claims, 4 Drawing Sheets

ELECTROCHROMIC DEVICE WITH LOW RESISTANCE ELECTRICAL CONNECTIONS

BACKGROUND OF THE INVENTION

1. Field of the Invention

The present invention relates to an improvement in an electrochromic device. Hereinafter, electrochromic is referred to as "EC", and an EC device is referred to as an "ECD".

2. Related Background Art

A material which undergoes reversible electrolytic oxidation or deoxidation and thereby reversibly takes on a color when subjected to a positive or negative voltage is called an electrochromic (EC) material. The color change phenomenon itself is called electrochromism. Attempts have been made for over 20 years to manufacture from such an EC material an EC device (ECD) which takes on color or returns to its transparent state by the adjustment of an applied voltage, and further to utilize such an ECD in a light control device (e.g., glare shielding mirror or a 7-segment figure display device). For example, Japanese Patent Publication No. 52-46098 proposes a solid state ECD in which a transparent electrode film (cathode), a tungsten trioxide thin film, an insulating film made of, for example, silicon dioxide, and an electrode film (anode) are formed in sequence on a glass substrate. When an electric field is applied to this ECD, the tungsten trioxide ($WO_3$) thin film becomes blue. The color of the $WO_3$ thin film fades away and the thin film returns to its transparent state when the polarity of the electric field is reversed. This coloring and color change reversing mechanism of the EC material has not yet been explained. However, it is believed that a small amount of water contained in $WO_3$ and the insulating film (ion conductive layer) controls coloring and reversing of color change of $WO_3$. The reaction formula when $WO_3$ takes on a color is theorized as follows:

Cathode side:

$$H_2O \longrightarrow H^+ + OH^-$$

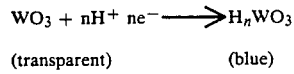

$$WO_3 + nH^+ + ne^- \longrightarrow H_nWO_3$$

(transparent)      (blue)

Anode side:

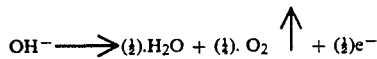

$$OH^- \longrightarrow (\tfrac{1}{2})H_2O + (\tfrac{1}{4})O_2 \uparrow + (\tfrac{1}{2})e^-$$

At least one of a pair of electrode layers that is directly or indirectly separated by an EC layer must be transparent so that coloring or disappearance of color of the EC layer can be observed therethrough. In the case of transmitting type ECD, both of the electrode layers must be transparent. Examples of transparent electrode materials are $SnO_2$, $In_2O_3$, ITO (a mixture of $SnO_2$ and $In_2O_3$), and ZnO. However, these materials do not exhibit excellent transparency, and this necessitates the electrode layers made of such materials being made thin. For this and other reasons, the ECD is generally formed on a substrate such as a glass or plastic plate.

The coloring response of the conventional ECD has heretofore proved unsatisfactory, and it is this problem which is a principal concern of the present invention.

SUMMARY OF THE INVENTION

An object of the present invention is thus to provide an electrochromic device which exhibits excellent coloring response.

In order to achieve this object, the present invention provides, in a first preferred form, an electrochromic device which comprises a first electrode layer, an electrochromic layer, and a second electrode layer formed in sequence on a substrate, at least one of the first and second electrode layers being a transparent electrode layer. The device further comprises conductive thin film having a resistance lower than that of the transparent electrode layer, the conductive thin film being formed on part of the substrate, and part of the transparent electrode layer being formed on the conductive thin film.

The present invention provides, in a second preferred form, an electrochromic device which comprises a first electrode layer, an electrochromic layer, and a second electrode layer formed on the substrate in sequence, at least one of the first and second electorde layers being a transparent electrode layer. The device further comprises a conductive thin film having a resistance lower than that of the transparent electrode layer, the conductive thin film being formed in contact with the transparent electrode layer and such that the area of the conductive thin film is larger than the corresponding underlying cross-sectional area of the substrate taken in a direction of the substrate thickness.

DETAILED DESCRIPTION OF THE PREFERRED EMBODIMENTS

The principle of a first embodiment of the present invention will be described below after consideration of FIG. 1 which shows the prior art technique.

Figure 1:
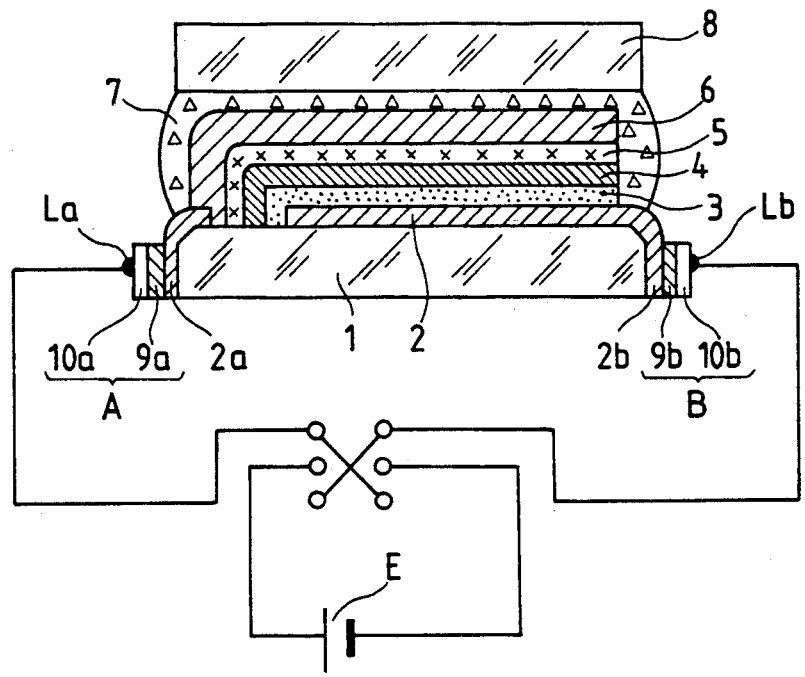
FIG. 1 is a cross-section of a conventional electrochromic device.

In FIG. 1, a reference numeral 2 denotes a transparent electrode layer (made of, for example, a mixture of tin oxide and indium oxide); 3; denotes a reversible electrolytic oxidizing or oxidation coloring layer (made of, for example, iridium oxide or iridium hydroxide); 4 denotes an ion conducting layer (made of, for example, tantalum oxide); 5 denotes a deoxidation coloring layer (made of, for example, tungsten oxide); and 6 denotes a transparent electrode layer (made of, for example, a mixture of tin oxide and indium oxide). An ECD is basically constructed by these layers 2 through 6 formed on a glass substrate 1. A reference numeral 7 denotes a sealing material, such as an epoxy resin, and a reference numeral 8 denotes a protection sealing substrate. The reversible electrolytic oxidizing layer or oxidation coloring layer 3, the ion conducting layer 4 and the deoxidation coloring layer 5 in combination form an EC layer.

In such an ECD, electrode connecting portions through which power is externally supplied to the electrode layers 2 and 6 must be provided. In the ECD shown in FIG. 1, electrode connecting portions 2a and 2b are provided on the two end surfaces of the glass substrate 1. When the transparent electrode layer 2 is formed on the surface of the substrate 1 by the vacuum deposition technique, part of it reaches the two end surfaces of the substrate 1 and forms the electrode connecting portions 2a and 2b.

Because the electrode connecting portions 2a and 2b are made of the same material as the transparent electrode layer 2, such as ITO or $SnO_2$, the resistance of the transparent electrode layers 2 and 6 is higher than that of a reflective electrode layer made of, for example, aluminum. Hence, on substantially the entire outer (left and right, respectively) surfaces of the electrode connecting portions 2a and 2b are respectively deposited thin films 9a and 9b of aluminum (Al) to a thickness of 50 $\mu$ and then thin films 10a and 10b of copper (Cu) to a thickness of 100 $\mu$ by the plasma spraying method to form composite conductive thin films A and B. The electric resistance of these conductive thin films A and B is so small that it can be ignored.

These conductive thin films A and B are connected to external wirings La and Lb, respectively. Electric charges or electrons supplied from an external power source E spread out over the conductive thin films A and B quickly and then flow into the electrode connecting portions 2a and 2b which are in contact with the conductive thin films A and B. This arrangement allows the speed at which electric charges or electrons are supplied to the electrode layers 2 and 6 to be increased when compared with the case in which the external wirings La and Lb are directly connected to the electrode connecting portions 2a and 2b.

As stated above, the conductive thin films A and B are formed by the plasma spraying method. However, they may be formed of the thick film technique by coating with conductive paste of the type which sets at normal temperatures or when heated, followed by drying (heating). Alternatively, they may be formed by another thin film technique such as vaccum deposition, sputtering or ion implantation.

When the conductive thin films A and B are formed on the surfaces of the electrode connecting portions 2a and 2b by, for example, the plasma spraying method, the electrode connecting portions 2a and 2b may be affected such that their surfaces become rough, thus resulting in an increased resistance. This may impair the connecting function of the electrode connecting portions 2a and 2b. additionally, if the layers 3 through 6 are formed in sequence after the formation of the electrode connecting portions 2a and 2b, and if the conductive thin films A and B are then formed on the surfaces of the electrode connecting portions 2a and 2b, formation of the conductive thin films A and B may also adversely affect the layers 2 through 6 formed on the substrate 1, thus deteriorating the performance of the ECD.

Figure 2:
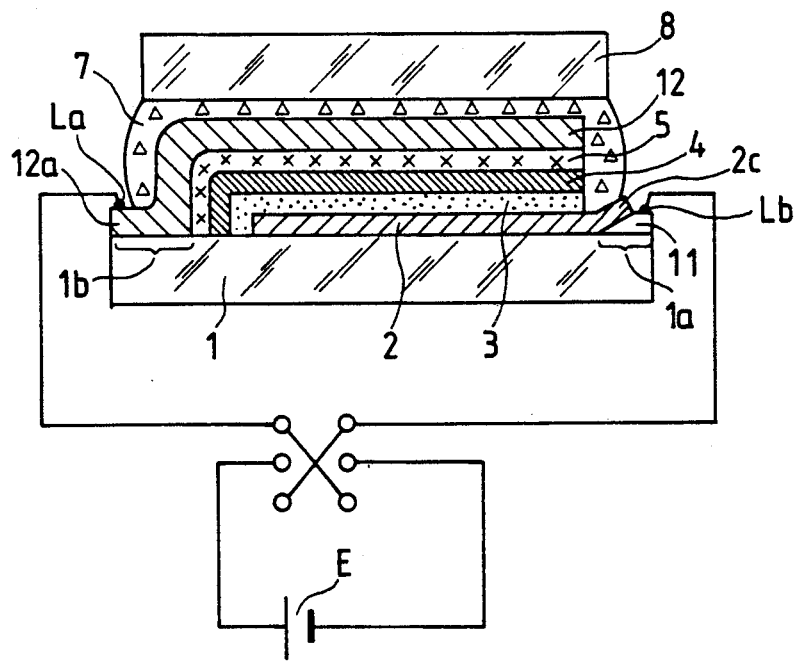
FIG. 2 is a cross-section of a first embodiment of an electrochromic device according to the present invention.

FIG. 2 is a schematic cross-sectional view of a first embodiment of an ECD according to the present invention.

A conductive thin film 11 made of, for example, gold (Au) is formed on a portion 1a of an upper surface of a glass substrate 1 by the plasma spraying method. A transparent electrode layer 2 is then formed on the glass substrate 1 such that an electrode connecting portion 2c is placed on part of the thin film 11 (on an inclined portion in the example shown in FIG. 1) by the vaccum deposition technique.

Thereafter, the reversible electrolytic oxidizing layer 3, the solid electrolyte layer 4 and the deoxidation coloring layer 5 are formed in sequence as the EC layer.

Next, a reflective electrode layer 12 made of aluminum (Al) is deposited over the deoxidation coloring layer 5 in such a manner that part of the reflective electrode layer 12 makes contact with an end portion 1b of the glass substrate 1.

Finally, an epoxy resin sealing material 7 is coated over the electrode connecting portion 2c of the transparent electrode layer 2 and over the upper surface of the electrode layer 12, except for an end portion 12a thereof. A sealing substrate 8 is then mounted on the sealing material 7.

In the thus-arranged ECD, an outer portion of the conductive thin film 11 which is not covered by the electrode connecting portion 2c and the end portion 12a of the reflective electrode layer 12 are connected to the external wirings Lb and La, respectively, which are in turn connected to the external power source E.

Thus, the electric charges (or current) from the external power source E spread over the conductive thin film 11 or the reflective electrode layer 12 quickly, and also flow into the transparent electrode layer 2 which is in contact with the thin film 11. As a result, the speed at which electric charges (or current) are supplied to the electrode layers 2 and 12 increases, and response of coloring and disappearance of color of the ECD therefore improves.

Figure 3:
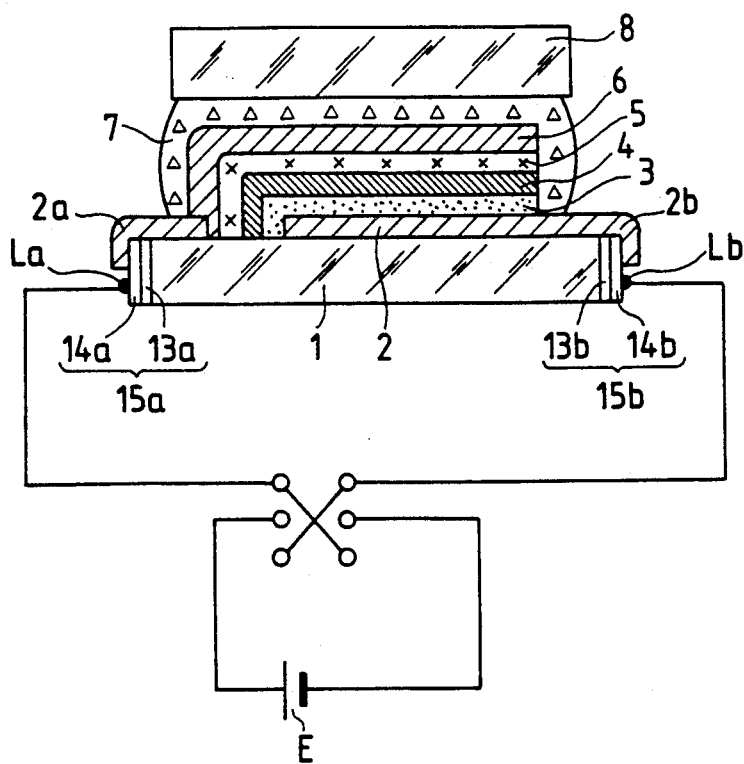
FIG. 3 is a cross-section of a modification of the first embodiment of FIG. 2.

FIG. 3 is a schematic cross-sectional view of a modification of the first embodiment according to the present invention.

On substantially the entirety of the two end surfaces of the glass substrate 1 shown in FIG. 3, there are formed first thin films 13a and 13b made of copper (Cu) and then thin films 14a and 14b made of nickel (Ni), by the plasma spraying method. These thin films of copper and nickel constitute composite conductive thin films 15a and 15b.

Next, the transparent electrode layer 2 is formed on the upper surface of the glass substrate 1 by vacuum deposition in such a manner that the portions thereof are spread over the end surfaces of the substrate 1, i.e., over part of each of the conductive thin films 15a and 15b.

Subsequently, the electrode layer 2, which covers the upper surface substrate 1, is separated into an electrode connecting portion 2a (for the electrode layer 6) and the lower electrode layer 2 by photoetching.

Next, the reversible electrolytic oxidizing layer 3, the solid electrolyte layer 4, and the deoxidation coloring layer 5 are sequentially formed as the EC layer in the same manner as that for the first embodiment which has been described with reference to FIG. 2.

Next, the transparent electrode layer 6 made of ITO is deposited over the deoxidation coloring layer 5 in such a manner that part thereof makes contact with the electrode connecting portion 2a.

Finally, the epoxy resin sealing material 7 is applied, and then the sealing substrate 8 is mounted on the sealing material 7.

In the thus-arranged ECD, the outer portions of the conductive thin films 15a and 15b, which are not covered by the electrode connecting portions 2a and 2b, are connected to the external wirings La and Lb, which are in turn connected to the external power source E, so as to supply a voltage to the electrode layers 2 and 6 through the electrode connecting portions 2a and 2b.

Since the thin films 15a and 15b are provided on the two end surfaces of the substrate 1, the display area of the substrate 1 increases, making the appearance of the ECD neater. Furthermore, when a voltage is applied between the electrode layers 2 and 6, the electric charges from the external power source E spread over the conductive thin films 15a and 15b quickly and flow into the electrode layers 2 and 6 through the electrode connecting portions 2a and 2b. In consequence, the speed at which the electric charges or currents are supplied to the electrode layers 2 and 6 increases, and response of coloring and disappearance of color of the ECD therefore improves.

Figure 4:
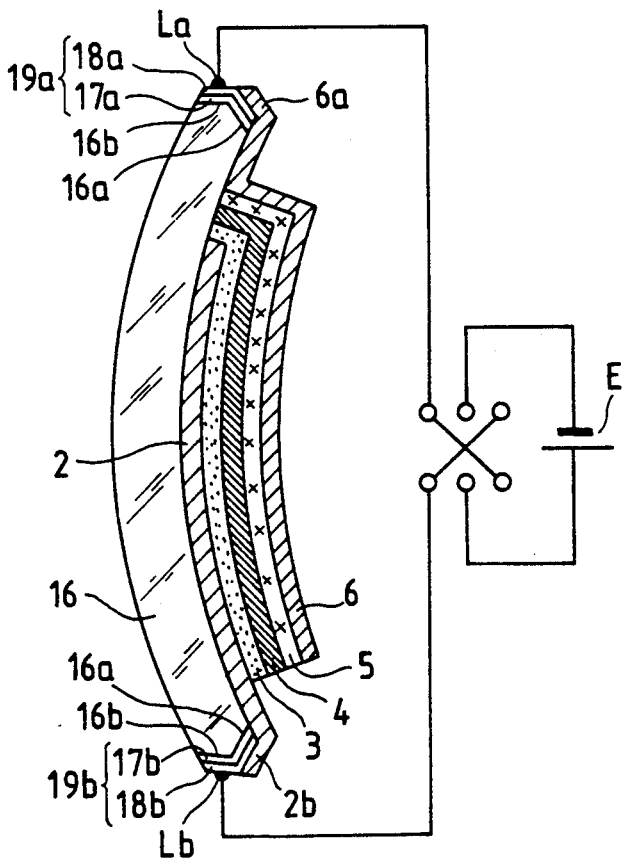
FIG. 4 is a cross-section of a second embodiment of an electrochromic device according to the present invention.

FIG. 4 is a schematic cross-sectional view of a second embodiment of the ECD according to the present invention. This embodiment employs a spectacle lens 16 as the substrate.

The two end surfaces of the spectacle lens 16 are formed into V-shape so that the spectacle lens 16 can be easily incorporated in a sunglass frame. On substantially the entirety of the end surfaces, each of which consists of inclined surfaces 16a and 16b, there are formed first thin films 17a and 17b made of silver (Ag) to a thickness of about 1 μm and then thin films 18a and 18b made of gold (Au) to a thickness of about 500 Å by plasma spraying. The two layers of silver and gold formed on the respective end surfaces of the lens 16 constitute composite conductive thin films 19a and 19b.

Response of coloring and reversing of color change improves by making the area of the thin film larger than the area of the corresponding underlying of the substrate 16 which is taken in a vertical direction in which the ECD is laminated (the direction of the substrate thickness).

Next, the transparent electrode 2 made of ITO is deposited on a portion of the lens substrate 1 and on a portion of the conductive thin film 19b to a thickness of about 200 nm. Thereafter, the reversible electrolytic oxidizing layer 3 made of a mixture of tin oxide ($SnO_2$) and iridium oxide ($IrO_2$), the solid electrolyte layer 4 made of tantalum oxide ($Ta_2O_5$), and the deoxidation coloring layer 5 made of tungsten oxide ($WO_3$) are formed in sequence as the EC layer in the same manner as that for the first embodiment. The thickness of the layer 3 is about 150 nm, whereas those of the layers 4 and 5 are 500 nm.

Finally, the transparent electrode layer 6 made of ITO is formed on the upper surface of the deoxidation coloring layer 5 and on part of the conductive thin film 19a to a thickness of about 200 nm.

In this embodiment, since the electrode connecting portions 2b and 6a and the conductive thin layers 19b and 19a which are respectively in contact with the electrode connecting portions 2b and 6a are formed on the V-shaped end surfaces of the substrate, the display area of the upper surface of the lens substrate 1 can be increased. More particularly, the overall upper surface of the lens substrate 1 can be made the display area, and this makes the appearance of the ECD neater.

Figure 5:
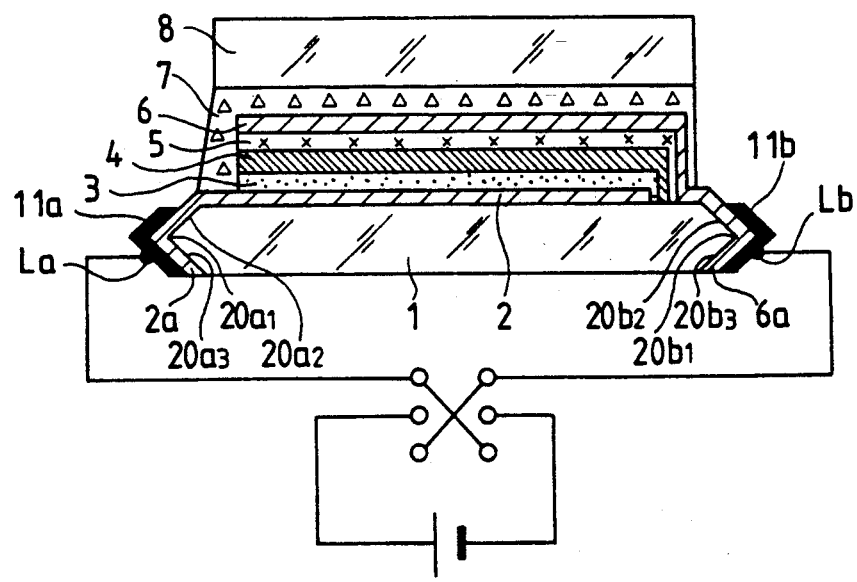
FIGS. 5, 6 and 7 are cross-sections of first, second and third modifications of the second embodiment of the present invention.

FIG. 5 shows a first modification of the second embodiment of the present invention. The ECD shown in FIG. 5 differs from that shown in FIG. 4 in that the electrode connecting portion 2a consists of inclined surfaces 20a2 and 20a3, in that the conductive thin film 11a is formed on these inclined surfaces, in that the electrode connecting portion 6a consists of inclined surfaces 20b2 and 20b3 and in that the conductive thin film 11b is formed on these inclined surfaces. In this modification, the same effect as that of the embodiment shown in FIG. 4 can be obtained if formation of the thin film is conducted such that it does not deteriorate the EC layer.

Figure 6:
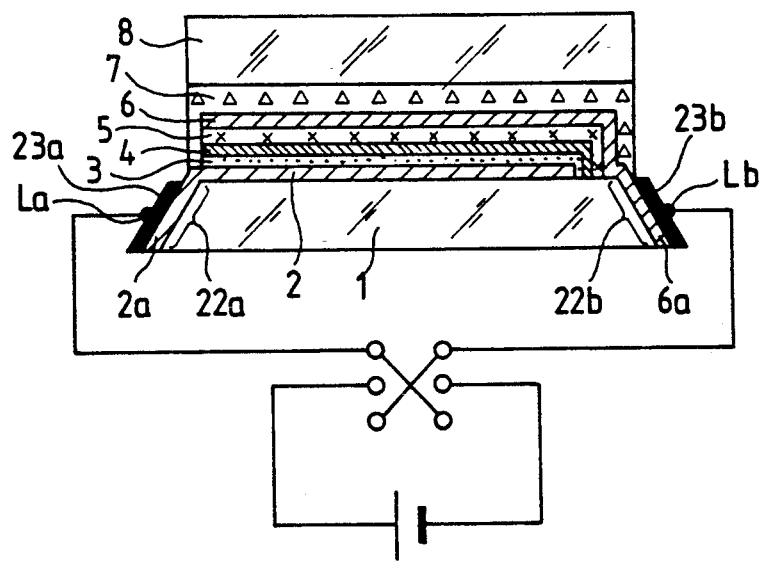

FIG. 6 shows a second modification of the second embodiment. The ECD shown in FIG. 6 differs from that shown in FIG. 5 in the shape of end surfaces 22a and 22b of the substrate 1. The electrode connecting portions 2a and 6a are formed on the end surfaces 22a and 22b, and conductive thin films 23a and 23b are then formed on the electrode connecting portions 2a and 6a.

Figure 7:
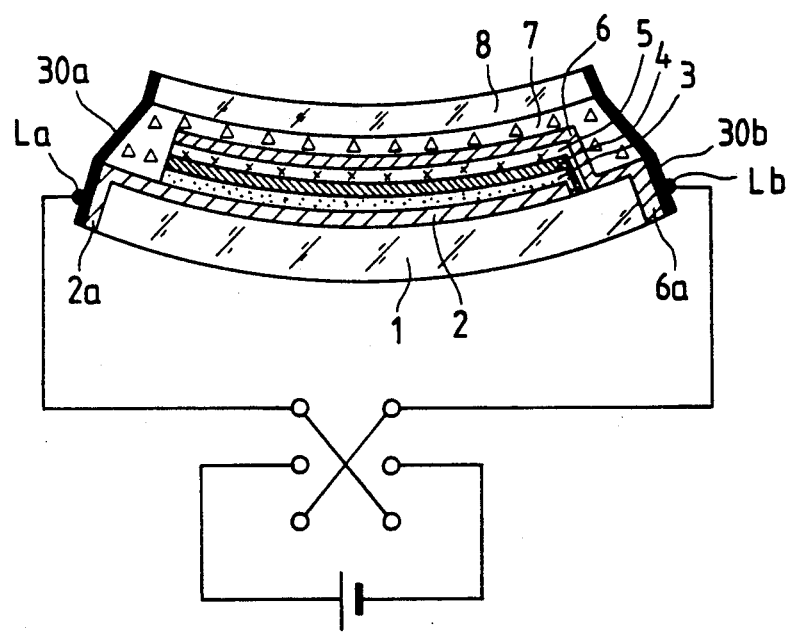

FIG. 7 shows a third modification of the second embodiment. The ECD shown in FIG. 7 differs from that shown in FIG. 6 in that it includes both a substrate 1 and a substrate 80 for a lens, and in that conductive thin films 30a and 30b are formed on the entire end surfaces of the ECD. The conductive thin films 30a and 30b are formed by masking the convex surface of the substrate 1 and the concave surface of the substrate 80 with a masking material and then by coating aluminum to a thickness of 50 μm and thereafter copper to a thickness of 100 μm over the region extending from the electrode connecting portions 2a and 6a to the end surfaces of the substrate 80 by a wet method. The resin 7 is easily deteriorated by water but the conductive thin films 30a and 30b protect the resin 7, and slow down deterioration thereof. Hence, the resin 7 does not deteriorate when the ECD is subjected to the hot water immersion test and neutral salt spray test.

What is claimed is:

1. An electrochromic device comprising:
a substrate;
a first electrode layer;
an electrochromic layer;
a second electrode layer, said first electrode layer, said electrochromic layer, and said second electrode layer being formed on said substrate in sequence, and at least one of said first and second electrode layers being a transparent electrode layer; and
a conductive thin film formed on an end surface of said substrate, said conductive thin film having a resistance lower than that of said transparent electrode layer, and part of said transparent electrode layer overlapping said end surface and being formed on said conductive thin film such that said conductive thin film has a portion disposed between said overlapping part of said transparent electrode layer and said end surface of said substrate.

2. An electrochromic device comprising:
a substrate;
a first electrode layer;
an electrochromic layer;
a second electrode layer, said first electrode layer, said electrochromic layer, and said second electrode layer being formed on said substrate in sequence, and at least one of said first and second electrode layers being a transparent electrode layer; and a conductive thin film formed on an end surface of said substrate, said conductive thin film having a resistance lower than that of said transparent electrode layer, and part of said transparent electrode layer being formed on said conductive thin film such that said conductive thin film has a portion disposed between said part of said transparent electrode layer and said end surface of said substrate, and wherein an area of said end surface is larger than a corresponding underlying cross-sectional area of said substrate taken in the direction of the substrate thickness.

3. An electrochromic device according to claim 2, wherein said end surface has a V-shape cross-section.

4. An electrochromic device comprising:
a substrate;
a first electrode layer;
an electrochromic layer;
a second electrode layer, said first electrode layer, said electrochromic layer, and said second electrode layer being formed on said substrate in sequence, at least one of said first and second electrode layers being a transparent electrode layer, part of said transparent electrode layer being formed on an end surface of said substrate; and a conductive thin film having a resistance lower than that of said transparent electrode layer, said conductive thin film being formed on said part of said transparent electrode layer and having an area larger than a corresonding underlying cross-sectional area of said substrate taken in the direction of the substrate thickness.

5. An electrochromic device according to claim 4, wherein said end surface of said substrate has an area larger than said cross-sectional area of said substrate.

6. An electrochromic device according to claim 5, wherein said end surface has a V-shape cross-section.

7. An electrochromic device according to claim 5, further comprising another substrate formed on said second electrode layer, said conductive thin film extending from said part of said transparent electrode layer over at least part of an end surface of said another substrate.

8. An electrochromic device according to claim 7, further comprising a resin layer formed between said second electrode layer and said another substrate.

* * * * *